United States Patent [19]

Saegusa

[11] Patent Number: 4,790,502
[45] Date of Patent: Dec. 13, 1988

[54] CLAMP FOR DISPOSING AND SECURING SMALL-DIAMETER PIPE

[75] Inventor: Shigeru Saegusa, Shizuoka, Japan

[73] Assignee: Usui Kokusai Sangyo Kabushiki Kaisha, Shizuoka, Japan

[21] Appl. No.: 150,091

[22] Filed: Jan. 29, 1988

[51] Int. Cl.⁴ ............................................. F16L 3/08
[52] U.S. Cl. .................................. 248/74.1; 24/20 R
[58] Field of Search ................ 24/20 R, 20 LS, 279; 248/74.1, 74.5, DIG. 9; 285/62

[56]  References Cited

U.S. PATENT DOCUMENTS

| | | | |
|---|---|---|---|
| 1,040,926 | 10/1912 | Gibbs | 24/20 LS |
| 3,054,586 | 9/1962 | Kirkup | 248/74.1 |
| 4,141,107 | 2/1979 | Sheiman et al. | 248/74.1 |
| 4,490,888 | 1/1985 | Levant | 24/20 R |

FOREIGN PATENT DOCUMENTS 466689  7/1950  Canada ..................... 248/DIG. 9

Primary Examiner—Victor N. Sakran
Attorney, Agent, or Firm—Anthony J. Casella; Gerald E. Hespos

[57] ABSTRACT

A clamp for disposing and securing a metal pipe or a resin tube having a relatively small diameter is disclosed. The clamp has a gripping wall for clamping a pipe, the gripping wall being formed by bending the longitudinally central portion of a rectangular piece of plate in the shape of a cylinder which extends laterally, and flat support walls which are defined by two end portions, respectively, of the piece of plate which are contiguous with the gripping wall, the support walls being superposed one upon the other and provided with respective mounting bores which are disposed so as to align with each other when the clamp is secured to a base. The clamp is provided with a clamping wall defined by a projecting end portion of one of the support walls which projects beyond the edge of the other support wall. The clamping wall clamps the second support wall when the first support wall is folded at the time of securing the pipe, the clamping wall having a bore which is provided so as to align with the mounting bores. Further, a bore or a notch is formed in the fold portion of the first support wall. Accordingly, there is no fear of the clamped pipe coming out of position or coming off the clamp during transportation or movement of the product kept in storage. Thus, it is possible to facilitate handling of the product and improve the operation efficiency by a large margin.

8 Claims, 1 Drawing Sheet

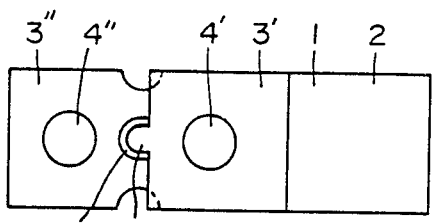
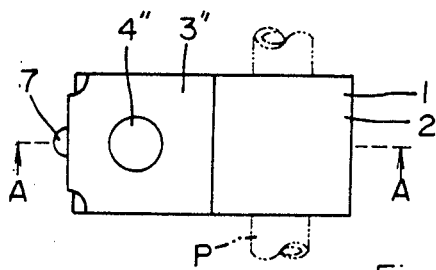
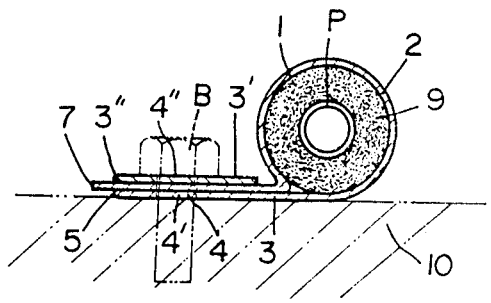
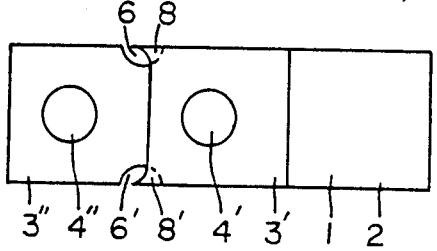
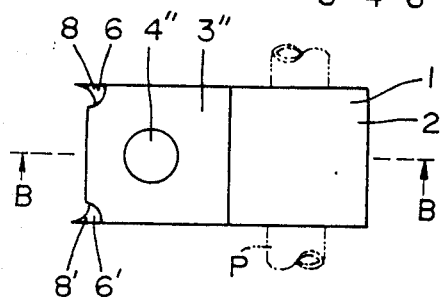
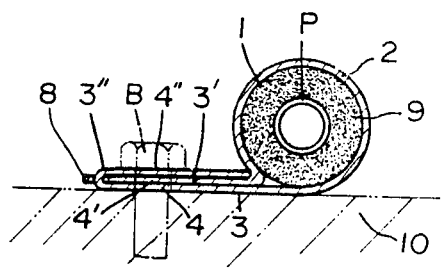
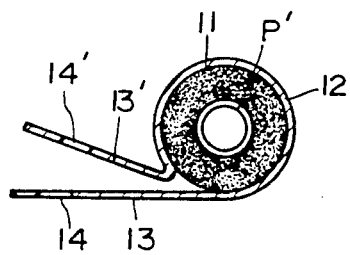
PRIOR ART 4,790,502

CLAMP FOR DISPOSING AND SECURING SMALL-DIAMETER PIPE

BACKGROUND OF THE INVENTION

1. Field of the Invention:

The present invention relates to an improvement in the structure of a clamp for disposing and securing metal pipes having relatively small diameters, i.e., about 30 m/m or less, which are generally used as feed passages for supplying oil or air in automobiles or various machines, installations or the like, or resin tubes having diameters of about 30 m/m or less.

2. Description of the Prior Art:

One example of conventional clamps of the type described above is shown in FIG. 7. As illustrated, the longitudinally central portion of a rectangular piece of plate is bent in the shape of a cylinder which extends laterally, thereby defining a gripping wall 12 for clamping a pipe P'. Two flat end portions which are contiguous with the gripping wall 12 are defined as support walls 13 and 13' which are superposed one upon the other. The support walls 13 and 13' are provided with respective mounting bores 14 and 14' which are aligned with each other when this clamp 11 is secured to a base.

The above-described conventional clamp 11 suffers, however, from the following problems. When the pipe P' is to be campled by the gripping wall 12, the support walls 13 and 13' are first separated from each other to wrap the gripping wall 12 around the pipe P', and after the pipe P' has been encircled with the gripping wall 12, the support walls 13 and 13' are brought toward each other to clamp the pipe P' with the gripping wall 12. For this reason, the support walls 13 and 13' are biased to move away from each other and therefore the gripping wall 12 readily becomes loose, which may result in the pipe P' coming out of position or coming off the clamp 11 during transportation of the product having the pipe P' mounted in position or during movement of the product kept in storage. Further, the looseness of the gripping wall portion may cause the mounting bores 14 and 14' to be offset from each other, resulting in stagnation of the flow process for securing the clamp 11 to the base on the assembly line or the like.

SUMMARY OF THE INVENTION

In view of the above-described circumstances, it is a primary object of the present invention to provide a clamp which is capable of effectively securing a pipe so that there is no fear of the pipe coming out of position or coming off the clamp during transportation or movement of the product kept in storage even after the pipe has been mounted in position, thereby facilitating handling of the product, and which is so designed that the support walls of the clamp are prevented from resiliently moving away from each other after a pipe has been clamped thereby so that there is no fear of the mounting bores being offset from each other, thus enabling a considerable improvement in the operation efficiency in securing the clamp to a base.

To this end, the present invention provides a metal clamp for disposing and securing a small-diameter pipe, the clamp having a gripping wall for clamping the pipe, the gripping wall being formed by bending the longitudinally central portion of a rectangular piece of plate in the shape of a cylinder which extends laterally, and flat support walls which are defined by two end portions, respectively, of the piece of plate which are contiguous with the gripping wall, the support walls being superposed one upon the other and provided with respective mounting bores which are disposed so as to align with each other when the clamp is secured to a base, wherein the improvement comprise a clamping wall defined by a projecting end portion of one of the support walls which projects beyond the edge of the other support wall, the clamping wall clamping the other or second support wall when the one or first support wall is folded at the time of securing the pipe, the clamping wall having a bore which is provided so as to align with the mounting bores, and a bore or a notch formed in the fold portion of the first support wall in the lateral direction.

BRIEF DESCRIPTION OF THE DRAWINGS

The above and other objects, features and advantages of the present invention will become clear from the following description of the preferred embodiments thereof, taken in conjunction with the accompanying drawings, in which like reference numerals denote like elements or portions, and in which:

FIG. 1 is a plan view of one embodiment of the clamp for disposing and securing a small-diameter pipe according to the present invention before it is used to secure a pipe;

FIG. 2 is a plan view of the clamp shown in FIG. 1 after it has been folded to secure a pipe;

FIG. 3 is a sectional view taken along the line A—A of FIG. 2;

FIG. 4 is a plan view of another embodiment of the present invention, which is equivalent to FIG. 1;

FIG. 5 is a plan view of the clamp shown in FIG. 4 after it has been folded to secure a pipe;

FIG. 6 is a sectional view taken along the line B—B of FIG. 5; and

FIG. 7 is a sectional view of a conventional clamp after it has been wrapped around a pipe to secure it.

DETAILED DESCRIPTION OF THE PREFERRED EMBODIMENTS

The present invention will be described hereinunder in detail with reference to the accompanying drawings.

In FIGS. 1 to 6, the reference numeral 1 denotes a metal clamp which is formed from a rectangular piece of plate. The clamp 1 is curved in the shape of a laterally extending cylinder at an appropriate portion thereof which is slightly closer to one end than the longitudinally central portion, thereby defining a gripping wall 2 for clamping a pipe P which is defined by a metal pipe or a resin tube. Two flat end portions which are contiguous with the gripping wall 2 are defined as support walls 3 and 3' which are superposed one upon the other. The support walls 3 and 3' are provided with respective mounting bores 4 and 4' which are disposed so as to align with each other to secure the clamp 1 to a base 10 by means of a bolt B or the like. The reference numeral 3" denotes a clamping wall which is defined by that portion of one support wall 3 which projects beyond the edge of the other support wall 3', the clamping wall 3" being folded so as to clamp the support wall 3' when the pipe P is secured. The clamping wall 3" has a bore 4" which is provided so as to align with the mounting bores 4 and 4'. A circular bore 5 is provided at the substantially central position in the lateral direction of the fold portion of the support wall 3 to facilitate folding of the clamping wall 3". The bore 5 is preferably arranged to engage with a projecting wall 7 which is provided at the corresponding position of the edge portion of the support wall 3' so that the bore 5 also serves as a positioning means. The bore 5 may be a slot. Referring to FIGS. 4 to 6, the reference numerals 6 and 6' denote notched engagement wall portions which engage with projecting walls 8 and 8', respectively, provided at the edge portion of the support wall 3' when the clamping wall 3" is folded. The reference numeral 9 denotes a tubular cover member made of an elastic material, for example, rubber, which is fitted on that portion of the pipe P which is clamped by the clamp 1.

According to the present invention arranged as described above, after the pipe P has been clamped at a predetermined position by the gripping wall 2 of the clamp 1, the support walls 3 and 3' are joined together, and one support wall 3 is folded at the circular bore or slot 5 to clamp the other support wall 3' with the clamping wall 3" which is defined by the projecting end portion of the support wall 3. When the clamp 1 is set, the projecting wall 7 or 8, 8' which are provided at the edge of the support wall 3' may be engaged with the circular bore of slot 5 or the notched engagement wall portions 6, 6' which are provided at the fold portion of the support wall 3 in the lateral direction.

As has been described above, the clamp for disposing and securing a small-diameter pipe is set by means of the clamping structure in which the clamping wall 3" of one support wall 3 clamps the other support wall 3' after the pipe P has been secured by the gripping wall 2 and the engagement structure in which the support walls 3 and 3' which are superposed one upon the other engage with each other. Therefore, it is possible to effectively prevent the pipe gripping wall portion from becoming loose due to the support walls 3, 3' resiliently moving away from each other by virtue of the clamping and engagement structures which are realized simply by folding one support wall 3 at the fold portion. Further, the above-described engagement structure enables the bores 4, 4' and 4" to be concentrically positioned, so that lateral offset is prevented. Accordingly, there is no fear of the secured pipe P coming out of position or coming off the clamp when the product is handled, for example, during transportation or movement of the product kept in storage. It is therefore possible to facilitate handling of the product, eliminate the troublesomeness in the flow process for securing the clamp to the base on the assembly line, and improve the operation efficiency by a large margin. Thus, the present invention provides a considerably useful clamp for disposing and securing a small-diameter pipe.

Although the present invention has been described through specific terms, it should be noted here that the described embodiments are not necessarily limitative and various changes and modifications may be imparted thereto without departing from the scope of the invention which is limited solely by the appended claims.

What is claimed is:

1. A metal clamp for disposing and securing a small-diameter pipe, said clamp having a gripping wall for clamping the pipe, the gripping wall being formed by bending the longitudinally central portion of a rectangular piece of plate in the shape of a cylinder which extends laterally, and flat first and second support walls which are defined by two end portions, respectively, of the piece of plate which are contiguous with said gripping wall, said support walls being superposed one upon the other and provided with respective mounting bores which are disposed so as to align with each other when said clamp is secured to a base, wherein the improvement comprises a clamping wall defined by a projecting end portion of said first support wall which projects beyond the edge of the second support wall, said clamping wall being folded over and clamping the second support wall to the first support wall securing the clamp to the pipe, said clamping wall having a bore which is provided to align with said mounting bores, and a cut portion formed in the fold of said clamp wall to said first support wall in the lateral direction, said second support wall having a projection on the longitudinal end thereof, said projection being engaged with the cut portion, whereby the engagement of the clamp wall with the second support all and the engagement of said projection with said cut portion ensures alignment of said clamp to facilitate subsequent mounting of the clamp to a base.

2. The clamp according to claim 1, wherein said cut portion is defined by either a circular bore or a slot.

3. The clamp according to claim 1, wherein said cut portion is defined by a notch.

4. The clamp according to claim 1, wherein said cut portion is provided in the substantially central portion in the lateral direction of said first support wall, and said projection is provided at the substantially central portion in the lateral direction of the edge portion of said second support wall.

5. The clamp according to claim 1 wherein said cut portion is provided at each lateral side of said first support wall, and said projection is provided at each lateral side of the edge portion of said second support wall.

6. The clamp according to claim 1, wherein said pipe is either a metal pipe or a resin tube.

7. The clamp according to claim 1, wherein a tubular cover member is interposed between the outer periphery of said pipe and the inner periphery of said gripping wall.

8. The clamp according to claim 7, wherein said cover member is made of a rubber material.

* * * * *